May 28, 1963 R. A. HUFFMAN 3,091,316
OVERRIDABLE CLUTCH MECHANISM
Filed Sept. 16, 1960
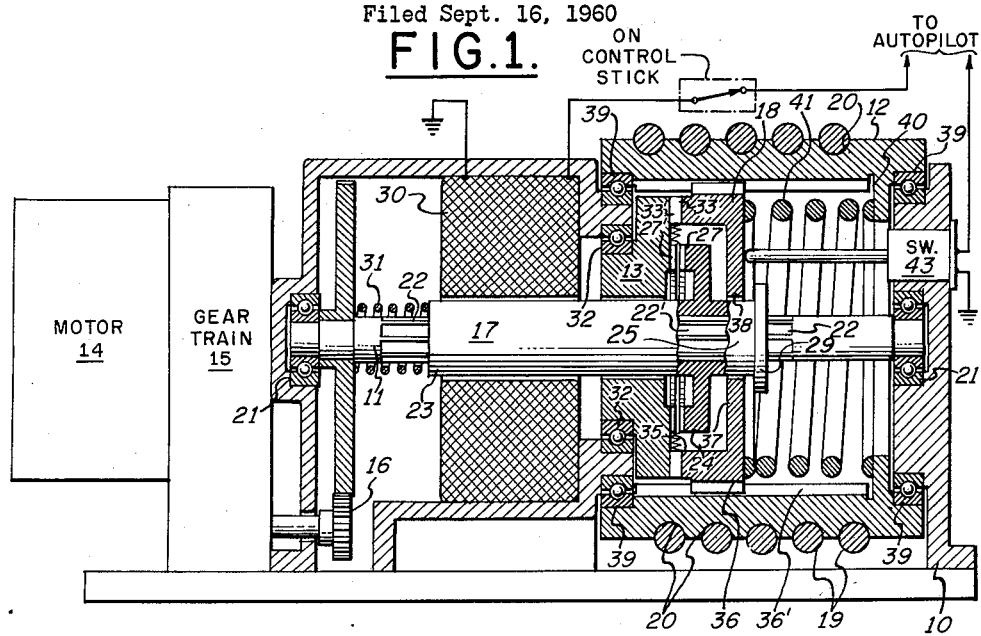
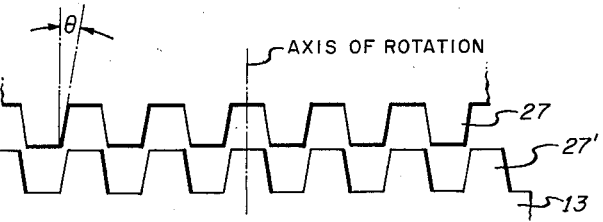
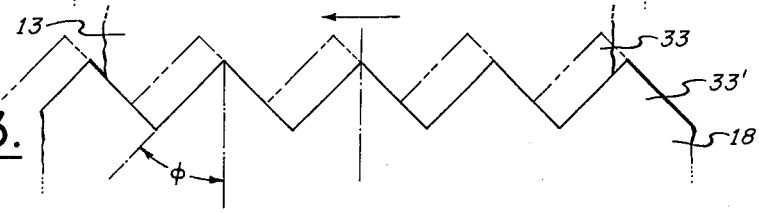
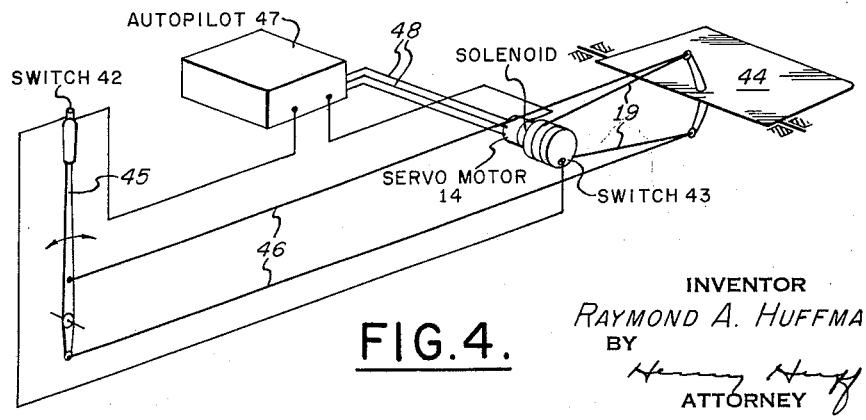
INVENTOR
RAYMOND A. HUFFMAN
BY
ATTORNEY United States Patent Office 3,091,316
Patented May 28, 1963

3,091,316
OVERRIDABLE CLUTCH MECHANISM
Raymond A. Huffman, Jericho, N.Y., assignor to Sperry Rand Corporation, a corporation of Delaware
Filed Sept. 16, 1960, Ser. No. 56,567
6 Claims. (Cl. 192—150)

This invention relates to coupling devices and, more particularly, it concerns a torque sensitive overridable clutch mechanism.

Certain rotational power systems require mechanical clutches which are operative in response to externally applied input commands as well as to the magnitude of torque they are transmitting. In most aircraft utilizing autopilot control, for example, such clutches are used between the servomotor and the control surfaces of the craft. The pilot, by means of externally applied commands, may engage and disengage the clutch which enables the servomotor to turn a drum about which is wound a cable from the control surfaces. If for any reason the autopilot clutch should fail to disengage in response to the externally applied command, or should the pilot desire to execute a sudden maneuver while the autopilot remains in operation, he may by movement of his control lever produce a sufficient amount of opposing torque through the cable and drum to cause the clutch to disengage, and thus render the control surfaces responsive solely to movement of the control lever.

Safety requirements in autopilot systems dictate the use of clutches which are free from all slippage. Furthermore, it is essential that these clutches disengage completely under a prescribed opposition torque in spite of atmospheric variations and repeated usage. Such conditions are best fulfilled by use of a jaw type clutch having teeth which are inclined with respect to their plane of rotation. The inclined teeth produce an axial thrust proportional to the amount of torque encountered which causes separation of the members and disengagement of the clutch.

A relatively large tooth angle will render the device less sensitive to variations in friction coefficient caused by atmospheric changes and repeated usage. A large tooth angle, however, also results in a high axial separation force which requires a correspondingly large engaging force. Thus, the power requirements for the engaging solenoid become very high and result in a substantial weight and cost problem. A small tooth angle would therefore be desired but lacks the necessary safety requirement of an axial separation force.

Consequently, it is an object of this invention to provide a torque sensitive mechanical clutch which will not slip in its engaged condition.

It is another object of this invention to provide such a clutch wherein its torque sensitive disengagement is positive and minimally affected by atmospheric variations and repeated usage.

It is another object to provide such a clutch wherein a minimum of power is required to produce and maintain engagement.

A further object is to provide such a clutch which is relatively light in weight and inexpensive.

A still further object is to provide a torque sensitive overridable clutch which is suitable for installation in a small aircraft autopilot.

Briefly, these objects are accomplished by the provision in series of a torque sensitive device and an axially actuated clutch. The torque sensitive device under rotative stress produces an axial displacement between its respective members and against a restraining spring. This displacement is transferred to the axially actuated clutch in opposition to the direction of engagement, thus causing the clutch to disengage.

Referring now to the figures:

FIG. 1 is a cross sectional view of a preferred embodiment of the invention;

FIGS. 2 and 3 illustrate the respective relationship of various elements necessary to carry out the principles of the invention; and FIG. 4 is a schematic representation of an autopilot system incorporating the invention.

A clutch embodying the principles of the present invention is shown in FIG. 1. Here a housing 10 rotatably supports an input shaft 11, an output drum 12 and an intermediate floating plate 13, in coaxial relationship. A motor 14, fixed with respect to the housing, supplies rotative power via a transmission means 15 to an input gear 16 fixed to the input shaft. This rotative power is transferred by means of an input connector 17 to the floating plate 13, and from the floating plate via an output connector 18 to the output drum 12. A cable 19 wound in a spiral groove 20 around the outside of the drum, transmits rotation of the drum to control surfaces (not shown).

The input shaft 11 is axially fixed but free to rotate in bearings 21 at either end of the housing. A plurality of splines 22 are cut in the surface of the shaft and serve to rotatably fix the shaft with respect to the input connector 17.

The input connector comprises a shaft portion 23, a flange portion 24 and an extension portion 25. Internal splines 22' on the shaft portion mate with the input shaft splines 22 and permit axial movement of the connector with respect to the shaft while maintaining rotational rigidity between the two pieces. A plurality of input clutch teeth 27 extend around the flange portion of the connector and engage with corresponding teeth 27' on the floating plate. The extension portion 25 of the input connector extends through a hole 38 in the output connector 18. An enlarged cap 29 terminates the extension portion and abuts against the rear of the output connector 18 when the teeth of each connector are in full mesh. The shaft portion 23 of the input connector extends through a solenoid 30 which is fixed with respect to the housing. The solenoid when activated produces an axial thrust upon the input connector 17 which causes its teeth 27 to mesh with their corresponding teeth 27' on the floating plate 13. A compression spring 31 supplies a counterforce to disengage the connector upon deactivation of the solenoid.

The intermediate floating plate 13 is axially fixed with respect to the housing by means of bearings 32. The plate includes sets of input and output clutch teeth, designated 27' and 33' respectively, in the form of concentric circles around one face 34. The teeth in these sets mate with corresponding teeth on the input and output connectors.

The output connector 18 comprises a ring portion 35 containing output clutch teeth 33 on one side, and spline projections 36 on the periphery. The output connector also includes a flange portion 37 having a hole 38 through which the extension portion of the input connector protrudes.

The output drum 12 is axially fixed with respect to the housing and is free to rotate upon bearings 39. The inner surface of the drum contains splines 36' which mesh with the corresponding spline 36 on the outer surface of the output connector 18. An internal flange 40 extends inwardly of the drum at one end and provides support for a restraining spring 41. The restraining spring extends between the output connector flange portion 37 and drum flange portion 40 and is stressed to oppose the axial thrust imparted to the output connector by the floating plate under rotational stress.

A manually operated pilot's dropout switch 42, and an automatic cutout switch 43, are connected in series between the solenoid 30, and the automatic pilot circuits (not shown).

Referring now to FIGS. 2 and 3, the tooth profiles of each of the connectors 17 and 18 are shown in relation to corresponding tooth profiles on the floating plate 13. In FIG. 2 it can be seen that the sides of the input clutch teeth 27 and 27' on the input conductor 17 and the floating plate 13, respectively, are nearly transverse to their plane of rotation. A slight angle of inclination θ, is provided however in order to reduce the effect of friction on resistance to disengagement under high torque loads. If the angle of inclination is precisely such that its tangent equals the coefficient of friction between the mating teeth, the frictional resistance of the teeth to axial movement of the input connector will be zero for all torque loads.

In FIG. 3 the sides of the output clutch teeth 33 and 33' on the output connector 18 and the floating plate 13, respectively, are seen to have a rather large angle of inclination φ. The large tooth angle results in an axial separation thrust between the respective members when transmitting torque. The magnitude of this thrust is proportional to the angle of inclination φ, of the teeth, the amount of applied torque and the coefficient of friction between the mating teeth. However, for large angles of inclination the effect of the coefficient of friction is decreased.

It is to be noted that the depth of engagement of the largely inclined output teeth 33, 33' is greater than that of the input teeth 27 and 27'. Thus, a lesser amount of axial movement is necessary for disengagement of the input connector 17 from the floating plate 13 than would be required for disengagement of the output connector 18.

When the clutch is in the disengaged condition the solenoid 30 is unactivated and the compression spring 31 maintains the input connector 17 in such a position that its clutch teeth 27 are separated from their corresponding teeth 27' on the floating plate 13. Also, in this condition the clutch teeth 33 and 33' on the output connector 18 and the floating plate 13 are held in mesh by reason of the force maintained on the output connector by the restraining spring 41. Thus, the floating plate, the output connector and the output drum are free to rotate with the cable independently of the rotation of the input shaft and input connector.

The clutch is engaged by activation of the solenoid 30 which produces a magnetic flux which acts to pull the shaft portion 23 of the input connector against the compression spring 31 until the input clutch teeth 27 of the input connector mesh with their mating teeth 27' on the floating plate 13. Rotational rigidity is now effected between the input motor 14 and the output drum 12.

It will be noted that because of the large tooth angle φ of the output clutch teeth 33 and 33' an axial separation force proportional to the rotational force will be developed between the output connector 18 and the floating plate 13. When the rotational force exceeds a predetermined level the axial separation force thus generated will overcome the bias of the restraining spring 41 and the output connector 18 will move away from the floating plate. This movement is communicated to the input connector 17 by means of the output connector flange 37 which abuts the cap 29 on the input connector. Because of the relatively shallow depth of engagement of the input clutch teeth 27 and 27' the input connector will become completely disengaged from the floating plate before the output connector. Upon disengagement of the input connector the rotative force between the output clutch teeth 33 and 33' becomes zero as does the axial separation force on the output connector. Consequently the restraining spring 41 returns the output connector to full engagement with the floating plate. Because the cap 29 on the input connector abuts on only one surface of the output connector, its return to engagement with the floating plate is not communicated to the input connector.

The solenoid 30 may be deactivated either prior to the occurrence of the disengaging torque, or if desired the axial movement of the output connector may be used to operate a switch which deactivates the solenoid. In either event, the compression spring 31 will maintain disengagement of the input connector while the output connector returns to full engagement.

FIG. 4 illustrates an application of the invention to an aircraft autopilot system. In this system a control surface 44 of the aircraft may be operated manually by means of a pilot's lever 45 or automatically by means of an autopilot 47. Autopilot commands are supplied via leads 48 to the servomotor 14. The servomotor, operating through the clutch mechanism, turns the drum 12 which is connected to the control surface through the drum cable 19. The control surface is similarly connected to the pilot's lever 45 through lever cables 46.

The pilot's dropout switch 42 is located on the pilot's lever. By depressing this switch the autopilot 47 and the clutch solenoid 30 are deactivated, bringing the control surface under manual operation. Should the solenoid fail to deactivate or should friction within the clutch mechanism prevent it from disengagement, the pilot may by operation of the pilot's lever produce a force through the control surface to the drum cable 19. This will result in an increased torque in the clutch mechanism causing it to disengage in the manner previously described.

If the pilot should exert a large counterforce against the autopilot commands without operating the pilot's dropout switch the clutch would ordinarily chatter in and out of engagement. The automatic cutout switch 30 however prevents this. When the clutch disengages as a result of excessive torque the axial movement of the output connector 18 operates the switch and causes the autopilot 47 and the clutch solenoid 30 to become deactivated.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A torque limiting clutch mechanism comprising a pair of toothed clutch members, a torque sensitive means including a pair of elements which experience a relative axial displacement under rotative stress, a resilient means connected to oppose said axial displacement, one of said clutch members being axially and rotationally fixed with respect to one of said pair of elements, means transmitting axial displacement of the other of said pair of elements to the other of said clutch members to disengage said clutch members, said other torque sensitive element being movable in a direction opposite the direction of said displacement independently of said other clutch member and means independent of said torque sensitive means for engaging said clutch members.

2. A torque limiting clutch mechanism for transmitting rotary power, said mechanism comprising a rotative input member, a rotatable output member and a rotary floating plate, said members and said plate having mutually parallel axes of rotation, first connecting means rotatably fixed but axially movable with respect to one of said members, second connecting means rotatably fixed but axially movable with respect to the other of said members, said first connecting means being disengageable from said floating plate by a certain amount of axial movement in a particular direction with respect to said plate, said second connecting means engageable with said plate to experience upon relative rotation with respect to said plate at least said amount of axial movement in said particular direction, resilient means between said floating plate and said second connecting means, said resilient means stressed to oppose axial movement of said second connecting means in said direction, said second connecting means being axially movable opposite said particular direction free of said first connecting means, said second connecting means further having a surface substantially transverse to said axis facing said direction, and abutting a corresponding surface of said first connecting means in the fully engaged position of both said connecting means and means independent of said second connecting means to engage said first connecting means with said floating plate.

3. The device described in claim 2 wherein said input and output members and said floating plate are coaxially fixed within a housing.

4. The device described in claim 2 wherein said second connecting means includes a series of projections which engage complementary recesses on one side of said floating plate, said projections and recesses having mutually contacting sides inclined with respect to their plane of rotation.

5. The device described in claim 4 wherein said first connecting means includes a series of projections which engage complementary recesses on said one side of said floating plate, said projections and recesses having mutually contacting sides substantially transverse to their plane of rotation.

6. An overridable clutch mechanism comprising a rotative input shaft and a rotatable output drum coaxially disposed and axially fixed within a housing, means supplying rotative power to said shaft and means utilizing power from said drum, an axially fixed rotary plate coaxial with said shaft and drum, first and second sets of toothed projections extending from one side of said rotary plate, first and second connectors having toothed projections corresponding respectively to said projections on said rotary plate and engageable therewith by axial movement of said connectors with respect to said plate, the teeth of said first set characterized by a plane of contact with corresponding teeth substantialy transverse to their plane of rotation, the teeth of said second set characterized by a plane of contact with corresponding teeth inclined with respect to their plane of rotation, said second set further having a greater depth of engagement than said first set, one of said connectors rotatably fixed with respect to said shaft, the other of said connectors rotatably fixed with respect to said drum, resilient means acting against said second connector toward said rotary plate, means for axially moving said first connector toward said plate, said first connector having a surface substantially parallel to its plane of rotation, said surface facing said rotary member and abutting a corresponding surface of said second connector in the engaged position.

References Cited in the file of this patent

UNITED STATES PATENTS

| | | |
|---|---|---|
| 1,988,413 | Bing | Jan. 15, 1935 |
| 2,597,140 | Versnel | May 20, 1952 |
| 2,856,046 | Bofinger | Oct. 14, 1958 |

FOREIGN PATENTS

| | | |
|---|---|---|
| 686,237 | Great Britain | Jan. 21, 1953 |